United States Patent

[11] 3,602,800

[72] Inventors David Feldman
Springfield;
John J. Golembeski, New Providence;
Tadikonda N. Rao, Plainfield; Ralph W.
Wyndrum, Jr., New Providence, all of, N.J.
[21] Appl. No. 826,407
[22] Filed May 21, 1969
[45] Patented Aug. 31, 1971
[73] Assignee Bell Telephone Laboratories, Inc.
Murray Hill, N.J.

[54] COUPLER FOR INTERCONNECTING CUSTOMER EQUIPMENT WITH TELEPHONE NETWORK
14 Claims, 4 Drawing Figs.

[52] U.S. Cl. .......... 323/8, 179/1, 323/81, 333/17
[51] Int. Cl. .......... G05f 1/00, G05f 1/60
[50] Field of Search .......... 333/17; 179/1 C, 2 C; 323/7, 8, 9, 81, 21

[56] References Cited
UNITED STATES PATENTS
2,948,843 8/1960 Klein .......... 323/81
3,349,319 10/1967 Aiken .......... 323/21

*Primary Examiner*—Gerald Goldberg
*Attorneys*—R. J. Guenther and Edwin B. Cave

ABSTRACT: A coupler for attaching customer-owned equipment to the telephone network permits any customer signal below a prescribed signal level to pass without distortion or attenuation but linearly attenuates signals exceeding the prescribed level. The coupler measures the mean power of the customer's signal and utilizes the results to switch the proper attenuating load across the line. The switch circuit of the coupler has a hysteresis characteristic to prevent distortion of the customer's signal by repeated switching between different alternating modes when the customer's signal has slight variations about the prescribed threshold level.

INVENTORS D. FELDMAN
J.J. GOLEMBESKI
T.N. RAO
R.W. WYNDRUM, JR.
BY [signature]
ATTORNEY

COUPLER FOR INTERCONNECTING CUSTOMER EQUIPMENT WITH TELEPHONE NETWORK

BACKGROUND OF THE INVENTION

1. Field of the Invention

This invention relates to electrical interconnection circuits and, more particularly, to circuits for limiting the level of signals from customer-owned equipment which are coupled to the telephone network.

2. Description of the Prior Art

The increasing use of both voiceband and data processing equipment and the need to transmit information from such equipment without modifying the signal has created a demand for an interconnection device or coupler through which such equipment can be coupled to the nationwide telephone network. Such a coupling device must satisfactorily couple the signal to the telephone network and simultaneously protect the network from signals which might degrade the quality of service thereon. In general the coupler should protect the telephone network from, among other things, customer-generated direct current and excessive signal levels.

Presently available interconnecting couplers utilize transformers and other inductive devices to couple the customer's signal to the telephone network. The customer's signal level is normally limited by a diode arrangement. The use of inductive devices and diode limiting introduces distortion into the transmitted signal. This, of course, is very undesirable. Additionally, the use of inductive devices often leads to greatly increased costs as such devices are not readily adaptable to low-cost batch fabrication methods such as integrated circuit techniques.

Accordingly, it is an object of this invention to enhance the ability of a coupling circuit to effect the required interconnection without distorting the coupled signal.

Another object is to enhance the ability of a coupling circuit to transmit a wide band of signals.

A further object is to simplify coupler circuits in order to be more amenable to integrated circuit techniques.

SUMMARY OF THE INVENTION

The foregoing objects and others are achieved in accordance with the principles of the invention by a coupling circuit wherein a detector circuit stage for measuring the input signal level is combined in circuit relation with an amplifier stage, a level shifter circuit stage, and an output control or switch stage. The mean power level of the input signal from the customer's equipment is measured by a mean power detector circuit utilizing a differential amplifier. The output from the detector is fed to a differential amplifier stage operated from a constant voltage source derived from the unregulated line voltage by a zener diode network. A single-ended output from this differential amplifier is used to drive, through a level shifter, a control or switch circuit. When the customer's signal is less than a preselected threshold, such as 1 milliwatt, the customer's signal is coupled directly to the telephone network without attenuation or distortion. When the customer's signal level exceeds the preselected threshold, the control circuit senses it and connects a suitable limiting load across the line to thereby limit the amount of customer signal power coupled to the telephone network. The limiting load may advantageously be a resistor to insure a linear attenuation of the signal. The control (switch) circuit has a hysteresis characteristic to prevent distortion of the coupled signal by repeated switching between various attenuating modes when the signal has slight variations around the threshold.

The coupler is designed to be made advantageously by integrated circuit techniques thereby facilitating mass production and reducing the cost and physical size of the coupler.

BRIEF DESCRIPTION OF THE DRAWINGS

The principles of the invention as well as additional objects and features thereof will be fully apprehended from the following detailed description and drawing in which.

DETAILED DESCRIPTION

Figure 1:
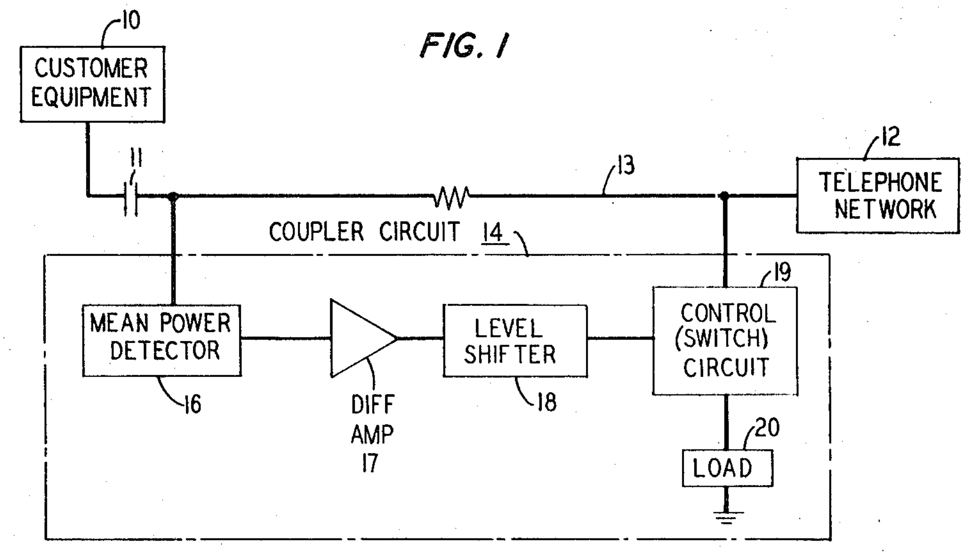
FIG. 1 is a block diagram illustrating how the customer's equipment is interconnected with the telephone network by the coupler circuit of this invention.
Figure 2:
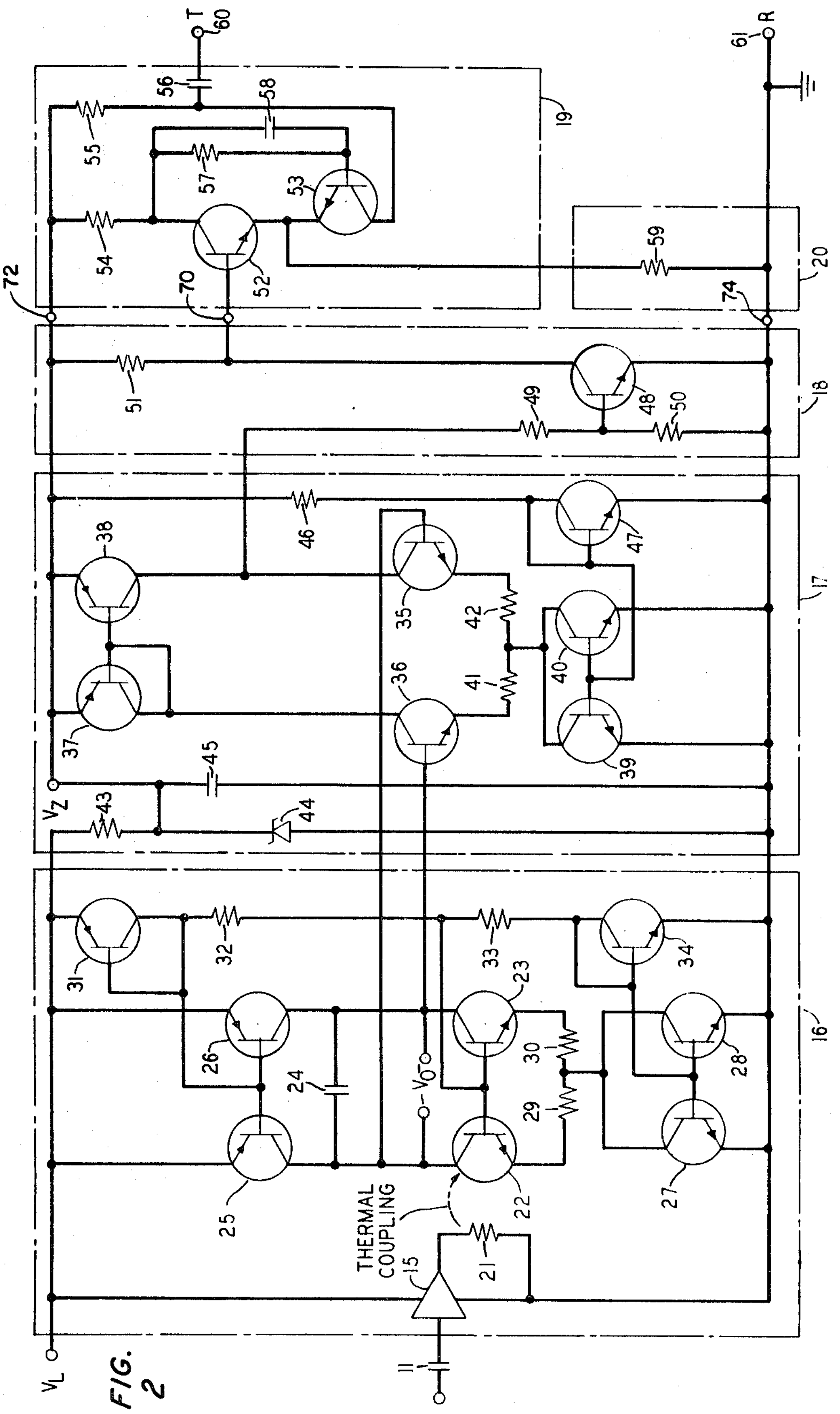
FIG. 2 is a schematic circuit diagram of the coupler circuit.

As shown in FIG. 1 the customer equipment 10 is connected to the telephone network 12 through a capacitor 11 and connection 13 having some finite impedance. The actual connection to the telephone network may be through a hybrid network not separately shown. Capacitor 11 provides the required direct-current blocking from the customer equipment. Paralleling the connection 13 is the coupler circuit 14 of this invention. As shown more fully in FIG. 2, a measure of the signal power from the customer equipment 10 is fed to the coupler 14 through an appropriate isolating amplifier 15 of standard design which isolates the coupler 14 from the customer equipment 10 and the network 12. Depending on the type of input signal and the level thereof the amplifier 15 may be eliminated altogether.

The amplifier 15 is part of a mean power detector 16. The mean power detector 16 is substantially similar to that shown in the copending application, Ser. No. 826,406, filed May 21, 1969, of T. N. Rao. In the detector 16 a measure of the signal power of the customer's input signal is first converted to thermal power by a resistor 21. The thermal power is thermally coupled to one transistor 22 of a transistor differential amplifier and is substantially isolated from the other transistor 23. The volt-ampere characteristics of the transistors 22 and 23 are very temperature dependent. Thus, the thermal power generated in resistor 21 and coupled to transistor 22 will cause a proportional change in the potential at the collector terminal of transistor 22. Since transistor 23 is isolated from the thermal power, no corresponding change in potential appears at the collector terminal of transistor 23 as a result of the thermal power generated by the input signal. Any change in ambient condition will equally affect both transistors 22 and 23. The output $V_o$ of the differential pair, the potential difference between the collector terminals of transistors 22 and 23, is a direct measure of the mean power level of the input signal. If the input signal is slowly varying, a capacitor 24 may be required between the collector terminals of transistors 22 and 23 to give the required integrating effect to the voltage $V_o$.

The particular biasing scheme used to bias the transistors 22 and 23 of the differential pair shown in the schematic of the detector 16 is substantially similar to that shown in the copending application, Ser. No. 826,424, filed May 21, 1969, of T. N. Rao.

Transistors 25, 26, 27 and 28 are used as current sources to replace large resistors and DC supply voltages which would otherwise be required in the collector and emitter circuits of transistors 22 and 23 in order to increase the common mode rejection and the differential gain of the differential arrangement. Resistors 29 and 30 are chosen to optimize the input impedance, differential gain, and bandwidth of the differential arrangement. The bases of transistors 25, 26, and 31 are at the same potential, therefore the collector currents of these transistors are equal when the characteristics of these transistors are matched. Likewise the bases of transistors 34, 27, and 28 are at the same potential and the collector currents of these transistors are equal when their characteristics are matched. Neglecting the base current of transistors 22 and 23 the collector currents of these transistors must equal the respective emitter currents. Thus, the collector currents of transistors 25, 26, 27, and 28 must all be equal. Therefore the differential arrangement is symmetrical and a differential output may be obtained simultaneously with the increased common mode rejection and differential gain obtained from using the transistor current sources instead of the large resistor. The collector currents are controlled by the resistors 32 and 33 which determine the potential appearing at the base terminals of the transistors. The emitters of transistors 25, 26, and 31 are connected to an unregulated potential source $V_L$ which may be the potential appearing across the lines of the telephone network. The emitters of transistors 27, 28, and 34 are connected to a reference potential which may be ground.

The collector terminals of transistors 22 and 23, i.e., the terminals of the output voltage $V_0$, are connected to the base terminals of transistors 35 and 36, respectively, which form the basic differential pair of a differential amplifier stage 17. The particular biasing arrangement for transistors 35 and 36 of the differential amplifier 17 comprising transistors 37, 38, 39, 40 and 47 and resistor 46 is substantially similar to arrangements commonly used in operational amplifiers. This biasing arrangement his high common mode rejection, but because of lack of symmetry a differential output cannot be obtained. However, in accordance with the invention a single-ended output is desirable at this location in the circuit and, consequently, the biasing arrangement shown is quite satisfactory. Resistors 41 and 42 are chosen to optimize the input impedance, differential gain, and bandwidth of the amplifier 17. A regulated voltage source $V_Z$ for biasing the amplifier 17 is derived from the unregulated source $V_L$ by a network comprising a zener diode 44 in parallel with a capacitor 45 connected to the source $V_L$ through a series resistor 43.

A single output, from the collector of transistor 35, is taken from the differential amplifier 17 and connected to a level shifter 18 comprising a transistor 48 and a common resistive voltage divider formed by resistors 49 and 50. Resistor 51 connects the collector terminal of transistor 48 to the regulated voltage source $V_z$ and the emitter is connected to a reference potential, usually ground. The output from the collector terminal of transistor 48 is connected directly to the base terminal of a transistor 52 in the switch circuit 19. The collector of transistor 52 is returned to the source $V_z$ through a resistor 54 and is connected to the base of transistor 53 through an C circuit comprising resistor 57 and capacitor 58. The collector of transistor 53 is returned to regulated source $V_z$ through a resistor 55 and is also connected to one input terminal 60 of the telephone network through a direct-current blocking capacitor 56. The emitter terminals of transistors 52 and 53 are directly connected and are connected to the other input terminal 61 of the telephone network through a load 20 comprising resistor 59. Transistors 52 and 53 are biased to form a regenerative bistable circuit in which one transistor is always conducting and the other is always nonconducting.

CIRCUIT OPERATION

Upon the receipt of any input signal from the customer's equipment 10 by the mean power detector 16, a measure of the signal power is converted into thermal power by resistor 21 and coupled to transistor 22. The thermal power generated is proportional to the mean power of the input signal. Thus, the output at the collector of transistor 22 will rise while that at the collector of transistor 23 will remain stationary, i.e., the magnitude of the output voltage $V_o$ will increase as a measure of the mean power level of the input signal from the customer. The output voltage $V_o$ is applied as an input to amplifier 17 and subsequently appears as a potential difference between the collector terminals of transistors 35 and 36. The amount of amplification will be established by an appropriate selection of the specific values of the various electrical components.

Figure 3:
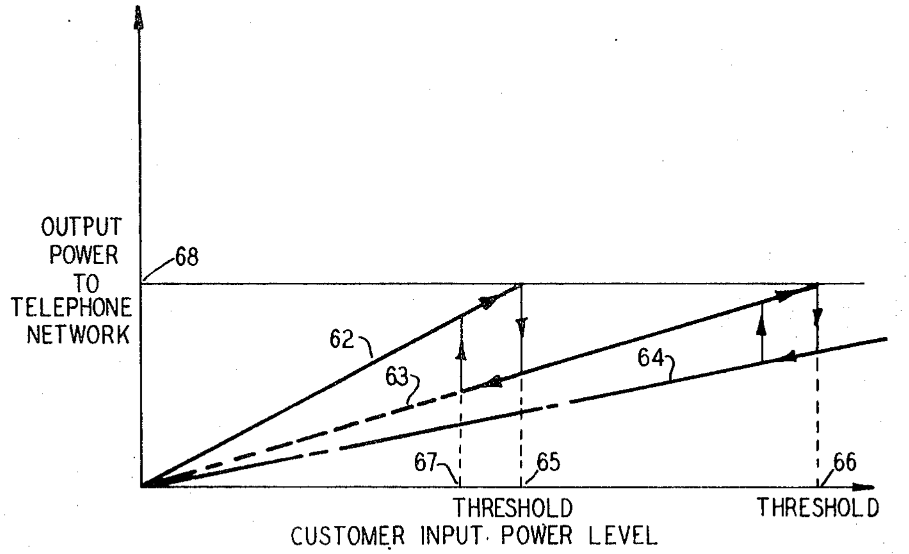
FIG. 3 is a representation of the hysteresis characteristic of the switch stage of the coupler circuit.

Assume that the customer's input signal level is slightly below the preselected threshold level 65 shown in FIG. 3 which determines the point above which the signal must be attenuated before being coupled to the network. The single output taken from the collector of transistor 35 is a measure of the customer's signal level. Then the amount of amplification in both the detector stage 16 and amplifier stage 17 and the values of resistors 49 and 50 will be established so that the single-ended output from the collector terminal of transistor 35, used as the input to level shifter 18, will be insufficient to cause transistor 48 to conduct. Thus, a high potential appears at the collector terminal of transistor 48 and consequently the base terminal of transistor 52 causing it to conduct. If resistor 54 is sufficiently large compared to resistor 59, the potential appearing at the collector terminal of transistor 52 and consequently at the base terminal of transistor 53 is insufficient to cause it to conduct. Looking back from terminal 60, the impedance to reference terminal 61 is quite large due to nonconducting transistor 53, i.e., essentially an open circuit compared with the path 13 back to the customer's equipment 10. In essence this means that the switch circuit 19 shown in FIG. 1 has not connected load 20 across the telephone network input terminals. Thus, the customer's signal is coupled directly to the network without attenuation or modification. The load on the customer's equipment 10 is the load of the network shown by loadline 62.

When the customer's signal level exceeds the preselected threshold 65, the resulting output from the collector of transistor 35 will be sufficient to cause transistor 48 to conduct. If resistor 51 is sufficiently large, the potential at the base terminal of transistor 52 drops to a level insufficient to maintain the transistor 52 in a conducting stage. Thus, the potential appearing at the collector terminal of transistor 52 rises, and the subsequent increase in potential at the base terminal of transistor 53 causes transistor 53 to conduct. Looking back from terminal 60, resistor 59 thus appears to be connected between terminals 60 and 61. Or expressed another way, this effectively places resistor 59 in shunt with the network load as far as the customer's equipment 10 is concerned. Switch circuit 19 has operated to connect the load 20 across the line. If resistor 59 is approximately the same magnitude as the network load, placing resistor 59 in parallel with network load reduces the load on the customer to that shown by loadline 63. Thus, the amount of customer power coupled to the network for a given customer input signal level is reduced. The amount of power coupled to the network is always maintained below a preselected safety level 68. The use of pure resistive elements such as resistor 59 to modify the customer's load insures minimum distortion of the signal because the loadlines remain linear. The resistive element 59 performs a dual function as the limiting resistor for transistors 52 and 53 and as the switched load element.

The potential on the base of transistor 53 must drop to a value measurably lower than the value which initiated the conduction before transistor 53 ceases to conduct. That is, the customer's signal level must drop to a value 67 which is measurably lower than the threshold value 65 before the load 20 is removed from the line. This creates a very desirable hysteresis effect whereby the customer's signal is not unnecessarily distorted by repeated switching between the various loadlines when the customer's signal is near the threshold value 65. Additional switch circuits could easily be added so that an additional shunt resistor could be connected across the line to further modify the customer's loadline as the signal level exceeds another preselected threshold 66. Loadline 64 illustrates this additional shunting effect.

Figure 4:
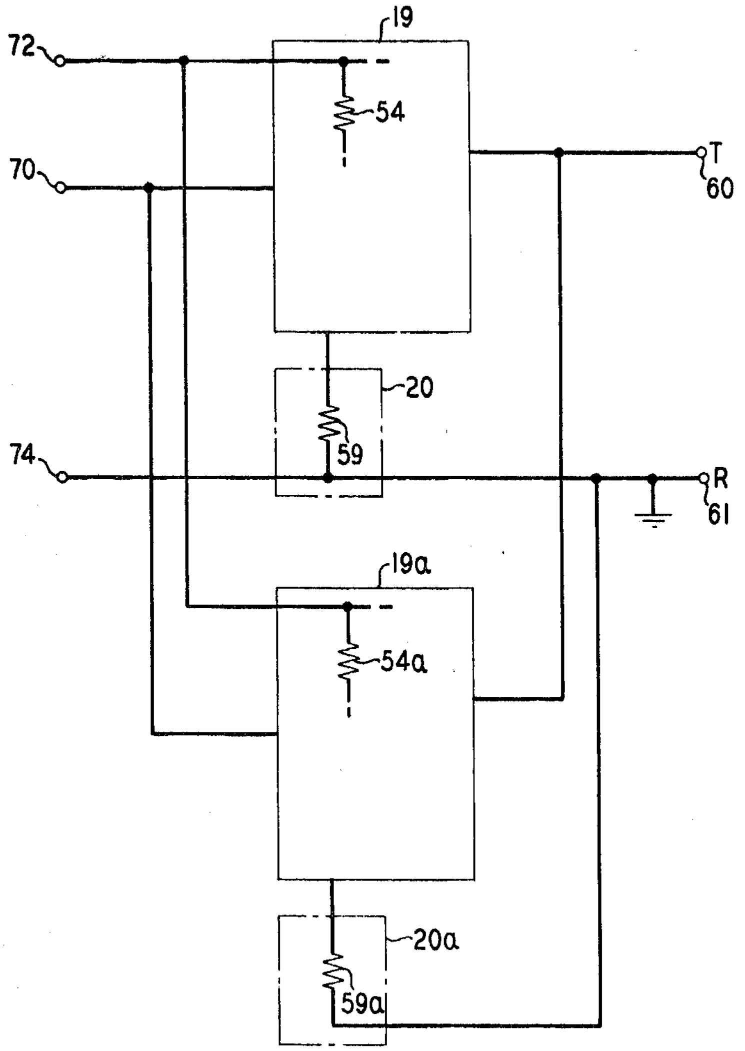
FIG. 4 is a schematic block diagram representation of a multiple of switch means arranged to sequentially add additional load resistors as the signal level exceeds a sequence of preselected thresholds.

FIG. 4 illustrates how a plurality of switch circuits operate sequentially and add additional load to change the total load across the line as the input signal exceeds a sequence of preselected thresholds. As previously explained, the threshold at which the load 20 is operable depends upon the ratio of the value of resistor 54 to the value of resistor 59. Thus a sequence of thresholds is specified by specifying a different ratio of values for resistor 54 and 59 in each switch circuit-load pair. For example, in the pair comprising switch circuit 19 and load 20 the ratio of the value of resistor 54 to resistor 59 might be 10 which makes load 20 operable at threshold 65 as previously explained. Correspondently, in the pair comprising switch circuit 19*a* and load 20*a* the ratio of the value of resistor 54*a* to 59*a* might be 20 which would make load 20*a* operable at threshold 66. The pair comprising switch circuit 19*a* and load 20*a* is connected across the telephone line in parallel with the pair comprising switch circuit 19 and load 20 and functions the same manner as the latter pair. Thus when the input signal power initially increases along loadline 62 until it reaches threshold 65, switch circuit 19 operates to place load 20 across the telephone line and establish a new loadline 63. If the input signal power should then further increase along loadline 63 to threshold 66, switch circuit 19*a* operates to place load 20*a* in parallel with load 20 and create another new loadline 64. Such a sequential addition of load can be performed to control any foreseeable input signal level.

It is to be understood that the embodiment disclosed herein is merely illustrative of the principles of the invention. Various modifications may be made thereto by persons skilled in the art without departing from the spirit and scope of the invention.

What is claimed is:

1. Circuit means for controlling the mean power level of a signal coupled to an input terminal of a second circuit means, comprising, in combination, detection means for measuring the mean power level of said signal, amplifier means responsive to said detection means, load means, and switch means responsive to said amplifier means for connecting said load means between said input terminal of said second circuit means and a reference potential whereby the level of said signal is controlled.

2. Circuit means for controlling the level of a signal coupled to an input terminal of a second circuit means, comprising, in combination, first and second transistors differentially connected so that the potential difference between the collector terminals of said first and second transistors is a measure of the mean power of said signal, amplifier means responsive to said first and second transistors, load means, and switch means responsive to said amplifier means for connecting said load means between said input terminal of said second circuit means and a reference potential whereby the level of said signal is controlled.

3. Apparatus in accordance with claim 2 including a capacitive element connected between said collector terminals.

4. Apparatus in accordance with claim 2 including means for biasing said first and second transistors comprising first and second current sources connected to said collector terminals of said first and second transistors, respectively, means for connecting the emitter terminals of said first and second transistors, a third current source connected to said connecting means, and means for controlling said first, second and third current sources, whereby a differential output can be obtained from said collector terminals of said first and second transistors.

5. Apparatus in accordance with claim 4 wherein said first and second current sources comprise, respectively, third and fourth transistors having matched characteristics and said third current source comprises fifth and sixth transistors having matched characteristics.

6. Apparatus in accordance with claim 5 wherein said control means comprises seventh and eighth transistors, said seventh transistor having characteristics matched with said characteristics of said third and fourth transistors, and said eighth transistor having characteristics matched with said characteristics of said fifth and sixth transistors.

7. Apparatus in accordance with claim 6 further including means for ensuring that all of the currents flowing through the emitter electrodes and through the collector electrodes of all of said transistor are substantially equal.

8. Circuit means for controlling the level of a signal coupled to an input terminal of a second circuit means, comprising, in combination, detection means for measuring the mean power level of said signal, amplifier means responsive to said detection means, said amplifier means including first and second transistors differentially connected so that the potential at the collector terminal of said second transistor is a measure of the mean power level of said signal, load means, and switch means responsive to said amplifier means for connecting said load means between said input terminal of said second circuit means and a reference potential whereby the level of said signal is controlled.

9. Apparatus in accordance with claim 8 including means for biasing said first and second transistors comprising first and second current sources connected to the collector terminals of said first and second transistors, respectively, means for connecting the emitter terminals of said first and second transistors, a third current source connected to said connecting means, and means for controlling said first, second and third current sources, whereby a single output may be taken from the collector of said second transistor.

10. Apparatus in accordance with claim 9 wherein said first and second current sources comprise, respectively, third and fourth transistors, said third current source comprises fifth and sixth transistors, and said control means comprises a seventh transistor.

11. Apparatus in accordance with claim 8 including means for biasing said transistors whereby said switch means exhibits a hysteresis characteristic in that the voltage potential required at said base electrode of said second transistor to initiate conduction in said second transistor is substantially greater than the said potential required to maintain said conduction.

12. Circuit means for controlling the level of a signal coupled to an input terminal of a second circuit means, comprising, in combination, detection means for measuring the mean power level of said signal, amplifier means responsive to said detection means, load means, and switch means responsive to said amplifier means for connecting said load means between said input terminal of said second circuit means and a reference potential, said switch means including first and second transistors, first means connecting the emitter terminals of said first and second transistors, and second means connecting the collector electrode of said first transistor to the base electrode of said second transistor so that said second transistor is caused to conduct and connect said load means between said input terminal and said reference potential when said first transistor is not conducting whereby the level of said signal is controlled.

13. Apparatus in accordance with claim 12 wherein said load means comprises a resistor connected between said first means and said reference potential.

14. Circuit means for controlling the level of a signal coupled to an input terminal of a second circuit means, comprising, in combination, detection means for measuring the mean power level of said signal, amplifier means responsive to said detection means, load means including a multiple of load devices, and switch means responsive to said amplifier means, said switch means comprising a multiple of switch circuits each of which is associated with a respective one of said load devices, said switch circuits operating sequentially to connect said respective load devices between said input terminal and a reference potential as said signal exceeds a sequence of preselected thresholds whereby said level of said signal is controlled.